J. H. CLARK.
ENGINE STARTER.
APPLICATION FILED JULY 6, 1915.

1,157,761.

Patented Oct. 26, 1915.
2 SHEETS—SHEET 1.

Witnesses:

James H. Clark
Inventor,
By R. C. Wright
Atty.

J. H. CLARK.
ENGINE STARTER.
APPLICATION FILED JULY 6, 1915.

1,157,761.

Patented Oct. 26, 1915.
2 SHEETS—SHEET 2.

Witnesses:

James H. Clark
Inventor,
By R. C. Wright
Atty.

UNITED STATES PATENT OFFICE.

JAMES H. CLARK, OF ST. MARIES, IDAHO, ASSIGNOR OF ONE-HALF TO J. M. RUSSELL, OF PORTLAND, OREGON.

ENGINE-STARTER.

1,157,761. Specification of Letters Patent. Patented Oct. 26, 1915.

Application filed July 6, 1915. Serial No. 38,318.

*To all whom it may concern:*

Be it known that I, JAMES H. CLARK, a citizen of the United States, residing at St. Maries, in the county of Benewah and State of Idaho, have invented a new and useful Improvement in Engine-Starters, of which the following is a specification, reference being had to the accompanying drawings.

My invention relates to that class of devices used for starting gas engines and commonly known as cranking devices.

The object of my invention is to provide a starting device which can be operated particularly from within a vehicle, either by use of the hand or foot, while the operator is seated. I attain these objects, as well as other advantages, by the construction, combination and arrangement of parts illustrated in the accompanying drawings which form a part hereof.

Figure 1:
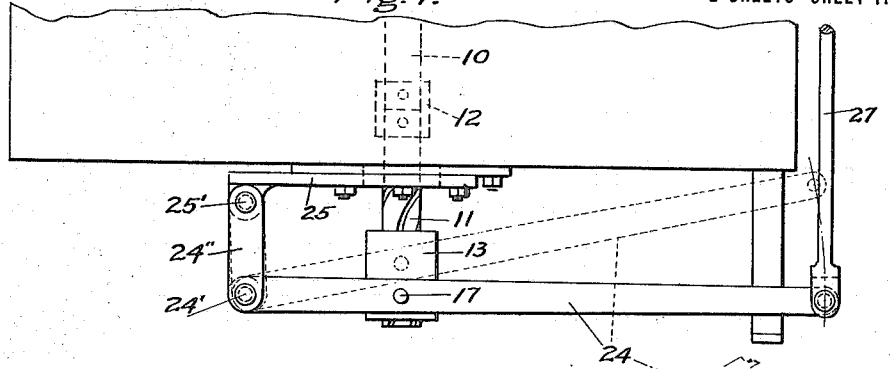
Figure 2:
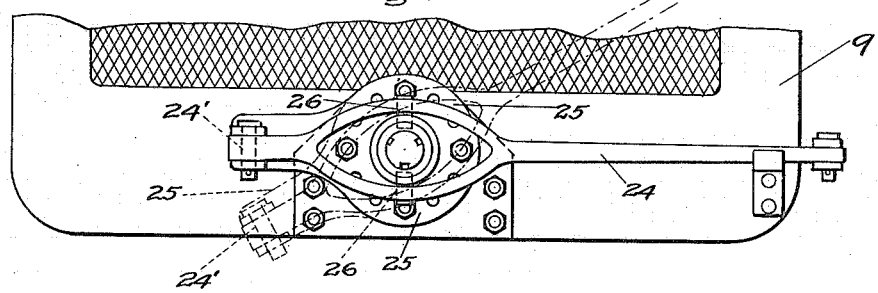
Figure 3:
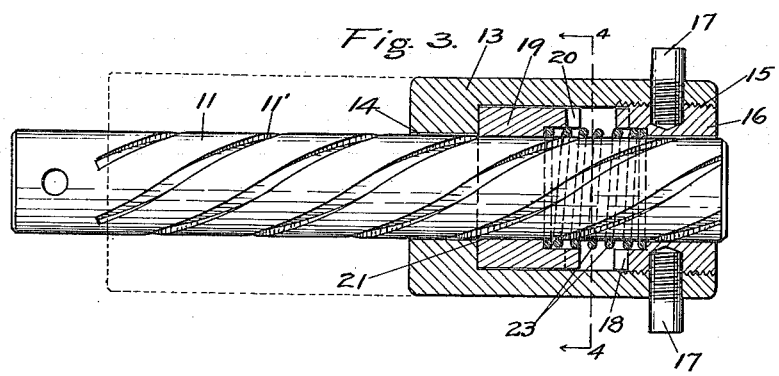
Figure 4:
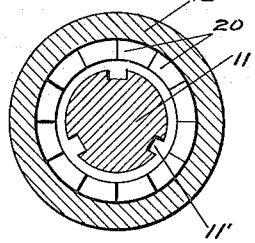
Figure 5:
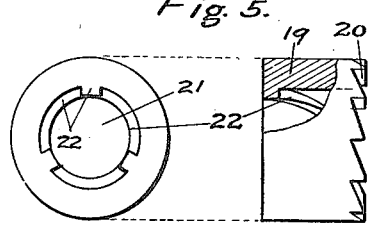
Figure 6:
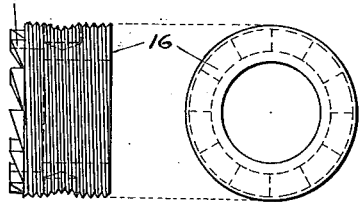
Figure 7:
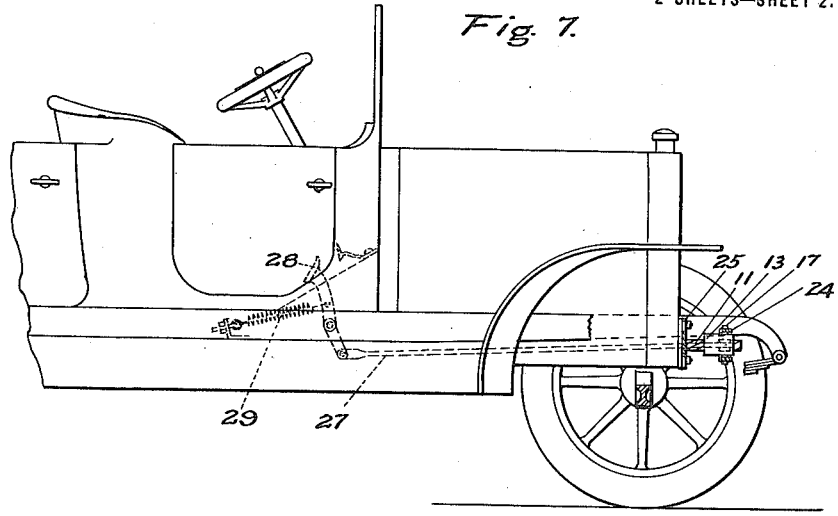
Figure 8:
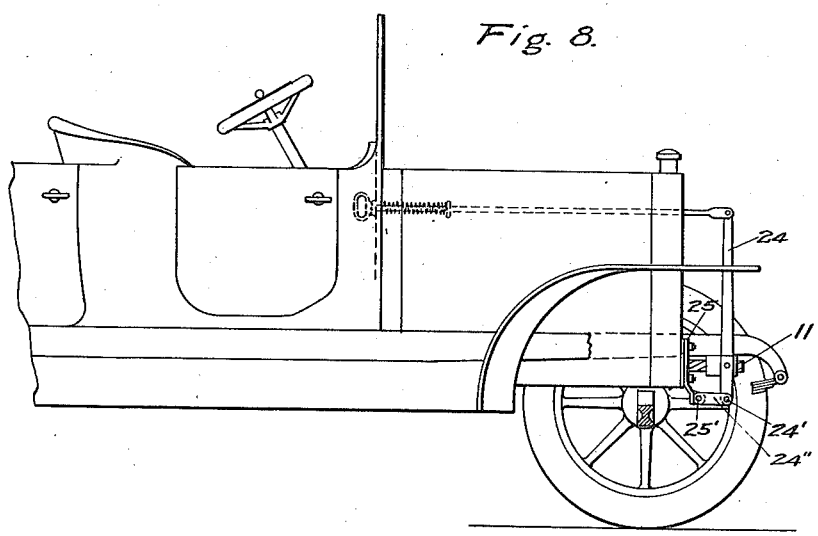

Figure 1 is a plan view of the device. Fig. 2 is a front elevation. Fig. 3 is an enlarged sectional elevation of the clutch, clutch-nut and screw-spindle. Fig. 4 is a sectional view of the clutch and screw-spindle on the line 4—4 of Fig. 3. Fig. 5 is a detail view of the clutch-nut, with part broken away, showing the thread, also an end elevation of the clutch-nut. Fig. 6 is a detail view of the clutch and an end elevation of same. Fig. 7 is a view of the device in a car, showing operating pedal. Fig. 8 is a like view showing hand lever connection.

Like numerals refer to like parts in all views.

9 is the body of the car and 10 is the horizontal engine shaft to be actuated. A screw-spindle 11 is rigidly joined to the shaft 10 by means of a securing sleeve 12 so that the screw-spindle forms an extension on the forward end of the shaft to a suitable point beyond. The spindle has helically formed grooves 11' in it. On the forward end of the screw-spindle 11 is a sleeve 13 which has an opening 14 in its rear end. The forward end of the sleeve 13 has a threaded opening 15. Within this opening a threaded clutch 16 is placed and rigidly secured therein by means of dowel pins 17—17. The rear end of the clutch 16 has teeth 18 thereon. Within the rear portion of the sleeve is a clutch-nut 19. Its rear end engages the inner part of the sleeve and it has teeth 20 on its forward end. It is of cylindrical form and has an opening 21 through it. The interior of the clutch-nut 19 has a thread 22 arranged to engage the spindle groove 11'. Between the clutch 16 and clutch-nut 19 a coil spring 23 is placed about the spindle 11. At one side of the forward end of the sleeve 13, a yoke lever is pivoted for its fulcrum on the pivot 24' in a link 24''. The link 24'' is in turn pivoted by the pivot 25' on a pivot plate 25. The plate 25 has a series of openings in it so that it can be adjusted to allow the arrangement of the yoke lever 24 in different angular positions, an example of which is shown by the dotted line position of the lever 24 in Fig. 2. The plate 25 is rigidly secured upon the forward end of the car body 9. The yoke of the lever 24 is secured in a fixed position on the clutch 16 by the dowel pins 17—17 passing through the openings 26—26 in the yoke bars. A reach rod 27 is pivotally attached to the free end of the yoke lever 24. The opposite end of the rod 27 is pivotally attached to an operating pedal 28. The pedal 28 is retained in a rear position by means of the spring 29. This form is shown in Fig. 7. Means to operate the yoke lever by hand are shown in Fig. 8.

It will now be seen that when the device is assembled in operative position in an automobile having a gas engine, the operator pushes the pedal 28 forward. This draws the yoke lever 24 toward the rear and causes the sleeve 13 to move along the spindle 11 until the teeth of the clutch engage the teeth of the clutch-nut 19 which in turn engages the helical grooves 11' of the spindle by means of the thread 22, and causes the spindle to rotate and this in turn rotates the engine shaft 10 and thus starts the motor. The same result is obtained by operating the hand rod shown in Fig. 8. Upon the engine starting, the spring 23 is actuated and this causes the clutch 16 to move forward and become released from engagement with the clutch-nut 19. It will be observed that the spindle 11 rotates freely within the sleeve 13 and clutch 16 when the latter is not in engagement with the clutch-nut 19. It will also be seen that the clutch-nut 19 rotates with the spindle 11 within the sleeve 13 at the same time.

I contend that the form and arrangement of my clutching device is different from any others now known. Also that it is very simple, effective in its operation, and can be cheaply installed in connection with any engine of the type for which it is designed.

Having fully described my invention, I claim:—

1. An engine starting device of the character described, comprising a helically grooved spindle extension of the engine shaft, a sleeve movable longitudinally along the spindle, which is rotatably arranged within the sleeve, a toothed clutch rigidly secured within the forward end of the sleeve, a clutch-nut within the rear part of the sleeve having an interior thread adapted to engage the spindle groove, said clutch-nut being formed with teeth on its forward end in position to engage the clutch teeth, and said clutch-nut being arranged to rotate upon the spindle and within the sleeve when not in engagement with the clutch, means to retain the clutch-nut in such rotatable position when not in engagement with the clutch, substantially as described.

2. An engine starting device of the character described, comprising a helically grooved spindle extension of the engine shaft, a sleeve movable longitudinally along the spindle, which is rotatably arranged within the sleeve, a toothed clutch rigidly secured within the forward end of the sleeve, a clutch-nut within the rear part of the sleeve having an interior thread adapted to engage the spindle groove, said clutch-nut being formed with teeth on its forward end in position to engage the clutch teeth, and said clutch-nut being arranged to rotate upon the spindle and within the sleeve when not in engagement with the clutch, means to retain the clutch-nut in such rotatable position when not in engagement with the clutch, means to draw the clutch into engagement with the clutch-nut, substantially as described.

JAMES H. CLARK.

Witnesses:
CYRUS CARUZZI,
G. P. EISMAN.